(12) United States Patent
Shiga et al.

(10) Patent No.: US 12,105,552 B2
(45) Date of Patent: Oct. 1, 2024

(54) SYNCHRONIZATION SYSTEM AND SYNCHRONIZATION METHOD OF CLOCK

(71) Applicant: NATIONAL INSTITUTE OF INFORMATION AND COMMUNICATIONS TECHNOLOGY, Tokyo (JP)

(72) Inventors: Nobuyasu Shiga, Tokyo (JP); Satoshi Yasuda, Tokyo (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 0 days.

(21) Appl. No.: 17/919,039

(22) PCT Filed: Apr. 14, 2021

(86) PCT No.: PCT/JP2021/015511
§ 371 (c)(1),
(2) Date: Oct. 14, 2022

(87) PCT Pub. No.: WO2021/210623
PCT Pub. Date: Oct. 21, 2021

(65) Prior Publication Data
US 2023/0195161 A1  Jun. 22, 2023

(30) Foreign Application Priority Data

Apr. 15, 2020  (JP) .................................. 2020-073166

(51) Int. Cl.
*G06F 1/12*  (2006.01)
(52) U.S. Cl.
CPC ..................................... *G06F 1/12* (2013.01)

(58) Field of Classification Search
CPC . G06F 1/12; G06F 1/14; H04J 3/0667; G04G 7/00
See application file for complete search history.

(56) References Cited

U.S. PATENT DOCUMENTS 9,094,142 B2 *  7/2015  Ruffini .................... H04J 14/08
2002/0174372 A1 * 11/2002  Venkataraman ...... H04L 69/329
713/400

(Continued)

FOREIGN PATENT DOCUMENTS

JP   2002-229869 A   8/2002
JP   2003-242278 A   8/2003

(Continued)

OTHER PUBLICATIONS

International Search Report issued in International Bureau of WIPO Patent Application No. PCT/JP2021/015511, dated Jun. 22, 2021, along with an English translation thereof.

*Primary Examiner* — Faisal M Zaman
(74) *Attorney, Agent, or Firm* — GREENBLUM & BERNSTEIN, P.L.C.

(57) ABSTRACT

It is provided a synchronization system capable of managing execution of synchronization for clocks to be mounted on various devices.
A synchronization system of clocks comprising: a leader device; a follower device capable of establishing communication connection with the leader device; and a server apparatus capable of establishing communication connection with the leader device and/or the follower device, the system further comprising: a time deviation calculator configured to calculate a time deviation between the leader device and the follower device; and a time corrector configured to correct a time in the follower device based on the calculated time deviation, wherein the synchronization system executes the time deviation calculator and/or the time (Continued)

corrector when the server apparatus generates, transmits, and/or receives predetermined information.

16 Claims, 4 Drawing Sheets

(56) References Cited

U.S. PATENT DOCUMENTS

| | | | | |
|---|---|---|---|---|
| 2008/0112439 A1* | 5/2008 | Vestal | ............... | H04L 12/4015 |
| | | | | 370/516 |
| 2010/0085989 A1* | 4/2010 | Belhadj | ............... | H04J 3/0667 |
| | | | | 370/503 |
| 2010/0153742 A1* | 6/2010 | Kuo | ............... | H04J 3/0667 |
| | | | | 713/189 |
| 2012/0009916 A1* | 1/2012 | Prikowitsch | .......... | G06F 16/273 |
| | | | | 455/422.1 |
| 2014/0064303 A1* | 3/2014 | Aweya | ............... | H04J 3/0667 |
| | | | | 370/509 |
| 2016/0043865 A1* | 2/2016 | Matsakis | ............... | H04L 63/12 |
| | | | | 713/168 |
| 2018/0145781 A1* | 5/2018 | Chaloupka | ............ | H04J 3/0644 |
| 2019/0045466 A1 | 2/2019 | Shiga et al. | | |

FOREIGN PATENT DOCUMENTS

| | | |
|---|---|---|
| JP | 2010-231310 A | 10/2010 |
| JP | 2011-200100 A | 10/2011 |
| JP | 2014-115794 A | 6/2014 |
| JP | 2017-143429 A | 8/2017 |

* cited by examiner

SYNCHRONIZATION SYSTEM AND SYNCHRONIZATION METHOD OF CLOCK

TECHNICAL FIELD

The embodiment of the present invention relates to synchronization system and synchronization method of clock.

BACKGROUND ART

As a synchronization method of clocks, it has been proposed to perform wireless communication in both directions between a leader node and a follower node, which are two stations on the ground, obtain a time difference between a clock of the leader node and a clock of the follower node from a propagation delay time corresponding to a round trip by data communication between the leader node and the follower node, and perform time correction of the follower node based on the time difference (e.g., refer to Patent Literature 1).

Meanwhile, in recent years, the number of sensors being shipped is increasing year by year due to the spread of IoT devices, and the number of sensors to be used in Japan and abroad is expected to increase further with the introduction of self-driving vehicles in the future. In a sensor or the like used in a self-driving vehicle, it is necessary to sense necessary information at an accurate timing, and thus, it is required to have a more precise clocking function. Therefore, a clock mounted on a sensor is required to be synchronized with a highly accurate leader clock and to maintain a precise clocking function, and furthermore, execution management of synchronization is required.

CITATION LIST

Patent Literature

Patent Literature 1: JP 2014-115794 A

SUMMARY OF INVENTION

Technical Problem

An object of the present invention is to provide a synchronization system and a synchronization method capable of managing execution of synchronization in a synchronization system of clocks to be mounted on various devices.

Solution to Problem

The present invention solves the above problem by any of the following [1] to [16].
[1] A synchronization system of clocks comprising: a leader device; a follower device capable of establishing communication connection with the leader device; and a server apparatus capable of establishing communication connection with the leader device and/or the follower device, the system further comprising: a time deviation calculator configured to calculate a time deviation between the leader device and the follower device; and a time corrector configured to correct a time in the follower device based on the calculated time deviation, wherein the synchronization system executes the time deviation calculator and/or the time corrector when the server apparatus generates, transmits, and/or receives predetermined information;

[2] The synchronization system according to [1], wherein the follower device includes: a transmission requestor configured to transmit a transmission request of predetermined information to the server apparatus; and a second predetermined information transmitter configured to transmit, upon receiving predetermined information from the server apparatus, the received predetermined information to the leader device, the server apparatus includes: a first predetermined information transmitter configured to transmit, upon receiving a transmission request for predetermined information from the follower device, the predetermined information to the follower device; and a predetermined information determinator configured to determine, upon receiving predetermined information from the leader device, whether the predetermined information received from the leader device corresponds to the predetermined information transmitted to the follower device, the leader device includes a third predetermined information transmitter configured to transmit, upon receiving predetermined information from the follower device, the predetermined information to the server apparatus, and the synchronization system executes the time deviation calculator and/or the time corrector when it is determined that the predetermined information received from the leader device corresponds to the predetermined information transmitted to the follower device;

[3] The synchronization system according to [1] or [2], wherein the follower device includes a first information transmitter configured to transmit information or a signal to the leader device, the leader device includes a second information transmitter configured to transmit information or a signal to the follower device, and the time deviation calculator calculates a time deviation between the leader device and the follower device based on a time at which information or a signal is transmitted from the leader device to the follower device, a time at which information or a signal is transmitted from the follower device to the leader device, a time at which the leader device transmits and the follower device receives and clocks the time, and a time at which the follower device transmits and the leader device receives and clocks the time;

[4] The synchronization system according to [3], wherein the time deviation calculator calculates a time deviation between the time of the leader device and the time of the follower device by calculating $\frac{1}{2} \times ((T_{SM} - T_S) - (T_{MS} - T_M))$, by defining: as $T_M$, a time at which information or a signal is transmitted from the leader device to the follower device; as $T_S$, a time at which information or a signal is transmitted from the follower device to the leader device; as $T_{MS}$, a time clocked by the follower device 3 at which the follower device 3 received information or a signal transmitted from the leader device 1; and further as $T_{SM}$, a time clocked by the leader device 1 at which the leader device 1 received information or a signal transmitted from the follower device 3;

[5] A synchronization system of clocks comprising: a leader device; a follower device capable of establishing communication connection with the leader device; and a server apparatus capable of establishing communication connection with the leader device and/or the follower device, the system further comprising: a phase deviation calculator configured to calculate clocks phase deviation between the leader device and the follower device; and a phase corrector configured to correct a phase in the follower device based on the calculated phase deviation, wherein the synchronization system executes the phase deviation calculator and/or the phase corrector when the server apparatus generates, transmits, and/or receives predetermined information;

[6] The synchronization system according to [5], wherein the follower device includes: a transmission requestor configured to transmit a transmission request of predetermined information to a server apparatus; and a second predetermined information transmitter configured to transmit, upon receiving predetermined information from the server apparatus, the received predetermined information to the leader device, the server apparatus includes: a first predetermined information transmitter configured to transmit, upon receiving a transmission request for predetermined information from the follower device, the predetermined information to the follower device; and a predetermined information determinator configured to determine, upon receiving predetermined information from the leader device, whether the predetermined information received from the leader device corresponds to the predetermined information transmitted to the follower device, the leader device includes a third predetermined information transmitter configured to transmit, upon receiving predetermined information from the follower device, the predetermined information to the server apparatus, and the synchronization system executes the phase deviation calculator and/or the phase corrector when it is determined that the predetermined information received from the leader device corresponds to the predetermined information transmitted to the follower device;

[7] The synchronization system according to [5] or [6], wherein the follower device includes a first information transmitter configured to transmit information or a signal to the leader device, the leader device includes a second information transmitter configured to transmit information or a signal to the follower device, and the phase deviation calculator calculates a phase deviation based on a phase difference between a phase of a carrier wave constituting information or a signal transmitted from the leader device to the follower device and a phase of a signal oscillated by an oscillator of a clock of the follower device when the information or the signal is received by the follower device, and a phase difference between a phase of a carrier wave constituting information or a signal transmitted from the follower device to the leader device and a phase of a signal oscillated by an oscillator of a clock of the leader device when the information or the signal is received by the leader device;

[8] The synchronization system according to [7], wherein the phase deviation calculator calculates a phase deviation between the leader device and the follower device by calculating $\Delta\Phi_P = \frac{1}{2} \times (\Delta\Phi_S - \Delta\Phi_M)$, by defining: as $\Delta\Phi_S$, a phase difference between a phase of a carrier wave constituting information or a signal transmitted from the leader device to the follower device and a phase of a signal oscillated by an oscillator of a clock when the information or the signal is received by the follower device; and as $\Delta\Phi_M$, a phase difference between a phase of a carrier wave constituting information or a signal from the follower device to the leader device and a phase of a signal oscillated by an oscillator of a clock when the information or the signal is received by the leader device;

[9] The synchronization system according to any one of [1] to [8], comprising a charger configured to charge an owner or a user of the follower device in accordance with generation, transmission, and/or reception of the predetermined information, calculation of a time deviation, correction of a time, calculation of a phase deviation, or correction of a phase;

[10] The synchronization system according to any one of [1] to [9], comprising a controller configured to control according to a charging amount by the charger: a frequency of executing the time corrector or the phase corrector; accuracy of a clock of the leader device that serves as a basis of calculation of the time deviation calculator or the phase deviation calculator; a distance between the leader device and the follower device; or a response speed of the leader device, the follower device, and/or the server apparatus;

[11] A synchronization method of clocks to be executed in a synchronization system of clocks, the system including a leader device, a follower device capable of establishing communication connection with the leader device, and a server apparatus capable of establishing communication connection with the leader device and/or the follower device, the method comprising: a time deviation calculating step of calculating a time deviation between the leader device and the follower device; and a time correcting step of correcting the time in the follower device based on the calculated time deviation, wherein the synchronization method executes the time deviation calculating step and/or the time correcting step when the server apparatus generates, transmits, and/or receives predetermined information;

[12] A synchronization method of clocks to be executed in a synchronization system of clocks, the system including a leader device, a follower device capable of establishing communication connection with the leader device, and a server apparatus capable of establishing communication connection with the leader device and/or the follower device, the method comprising: a phase deviation calculating step of calculating a phase deviation of clocks between the leader device and the follower device; and a phase correcting step of correcting a phase in the follower device based on the calculated phase deviation, wherein the synchronization method executes the phase deviation calculating step and/or the phase correcting step when the server apparatus generates, transmits, and/or receives predetermined information;

[13] A synchronization system of clocks comprising a leader device and a follower device capable of communicating with the leader device, the system further comprising: a time deviation calculator configured to calculate a time deviation between the leader device and the follower device; and a time corrector configured to correct a time in the follower device based on the calculated time deviation, wherein the synchronization system executes a time deviation calculator and/or a time corrector when the leader device generates, transmits, and/or receives predetermined information;

[14] A synchronization system of clocks comprising a leader device and a follower device capable of communicating with the leader device, the system further comprising: a phase deviation calculator configured to calculate a phase deviation of clocks between the leader device and the follower device; and a phase corrector configured to correct a phase in the follower device based on the calculated phase deviation, wherein the synchronization system executes the phase deviation calculator and/or the phase corrector when the leader device generates, transmits, and/or receives predetermined information;

[15] A synchronization method of clocks to be executed in a synchronization system of clocks, the system including a leader device and a follower device capable of communicating with the leader device, the method comprising: a time deviation calculating step of calculating a time deviation between the leader device and the follower device; and a time correcting step of correcting the time in the follower device based on the calculated time deviation, wherein the synchronization method executes the time deviation calculating step and/or a time correcting step when the leader device generates, transmits, and/or receives predetermined information;

[16] A synchronization method of clocks to be executed in a synchronization system of clocks, the system including a leader device and a follower device capable of communicating with the leader device, the method comprising: a phase deviation calculating step of calculating a phase deviation of clocks between the leader device and the follower device; and a phase correcting step of correcting a phase in the follower device based on the calculated phase deviation, wherein the synchronization method executes the phase deviation calculating step and/or the phase correcting step when the leader device generates, transmits, and/or receives predetermined information.

Advantageous Effects of Invention

The present invention can provide a synchronization system and a synchronization method capable of managing execution of synchronization in a synchronization system of clocks to be mounted on various devices.

DESCRIPTION OF EMBODIMENTS

Hereinafter, embodiments of the invention will be described with reference to the accompanying drawings. Hereinafter, description relating to effects shows an aspect of the effects of the embodiments of the invention and does not limit the effects.

Figure 1:
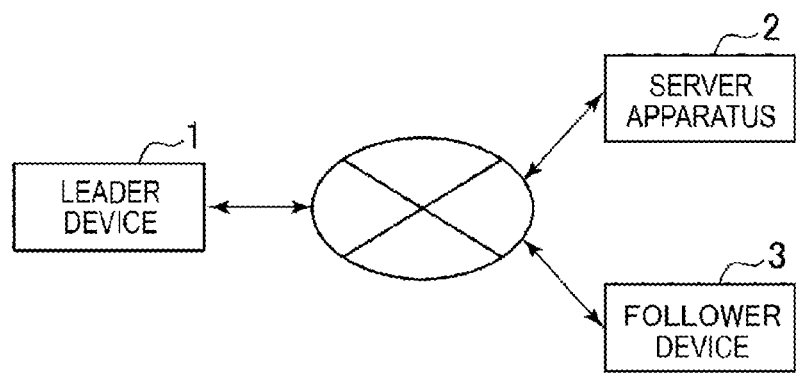
FIG. 1 is a block diagram illustrating a configuration of a synchronization system corresponding to at least one of the embodiments of the present invention.

FIG. 1 is a block diagram illustrating a configuration of a synchronization system corresponding to at least one of the embodiments of the present invention. As illustrated, the synchronization system includes a leader device 1, a server apparatus 2, and a follower device 3. The leader device 1 can establish communication connection with each of the server apparatus 2 and the follower device 3 via a communication network. The leader device 1 is a reference device for synchronizing a clock of the follower device 3, and one leader device 1 can also function as a leader device for a plurality of follower devices 3. The synchronization system of the present invention may also include a plurality of leader devices 1.

Furthermore, what functions as the follower device 3 for one leader device 1 can also function as the leader device for another follower device. The plurality of follower devices 3 exist for one leader device 1, and each of the plurality of follower devices 3 functions as the leader device for a plurality of other follower devices, thereby forming a pyramidal relationship.

The follower devices 3 can establish communication connection with each of the leader device 1 and the server apparatus 2 via a communication network. In this synchronization system, the time of each follower device 3 is synchronized with reference to the time clocked by the leader device 1, and the phase of the signal generated by an oscillator in the follower device 3 is synchronized with reference to the phase of the signal generated by the oscillator in the leader device 1.

Furthermore, the follower device 3 can function as a leader with respect to the other follower devices, each time of the other follower devices is synchronized with reference to the time clocked by the follower device 3, and each phase of the signal generated by the oscillator in the other follower devices is synchronized with reference to the phase of the signal generated by the oscillator in the follower device 3. The present synchronization system can also be applied when the follower device 3 is caused to function as a leader.

Figure 2:
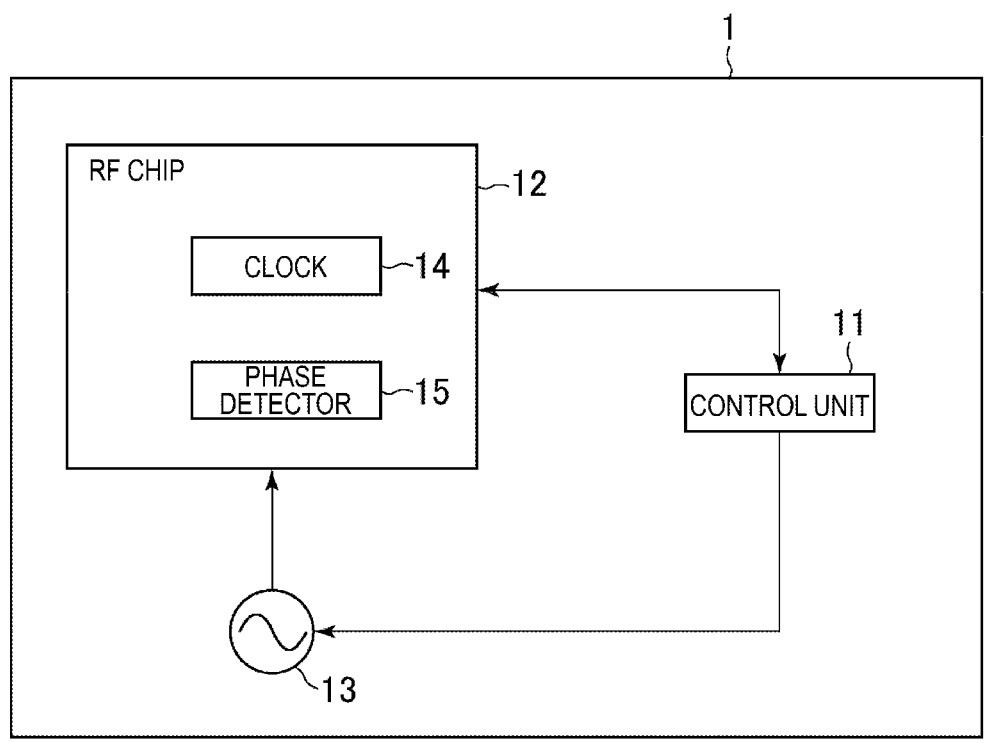
FIG. 2 is a block diagram illustrating a configuration of a leader device corresponding to at least one of the embodiments of the present invention.

The leader device 1 of the present invention will be described. FIG. 2 is a block diagram illustrating a configuration of a leader device corresponding to at least one of the embodiments of the present invention. The leader device 1 includes a control unit 11, an RF chip 12, an oscillator 13, a clock 14, and a phase detector 15. The RF chip 12 includes the clock 14 and the phase detector 15. In a case where the leader device 1 functions as, for example, a sensor device, other elements such as a sensor may be provided as necessary in addition to the control unit 11, the RF chip 12, the oscillator 13, the clock 14, and the phase detector 15.

The control unit 11 is not particularly limited, but for example, a microcomputer (microcontroller) can be used. The control unit 11 performs a program execution process based on a program and data. The RF chip 12 performs processes of receiving and transmitting a radio signal via a communication network 2. Data received by the RF chip 12 is subjected to an arithmetic process by the control unit 11.

The oscillator 13 oscillates at a predetermined frequency and outputs a signal for giving an operation timing of each unit of the apparatus. As the oscillator 13, an atomic oscillator or a crystal oscillator can be used. The clock 14 clocks the output signal of the oscillator 13 as a source vibration and outputs time. The time clocked by the clock 14 is controlled by the control unit 11 so as to be transmitted to the follower device 3 via the RF chip 12. The phase detector 15 detects the phase of a carrier wave constituting information received from the follower device 3, and detects the phase of the signal oscillated by the oscillator 13 in the leader device 1.

Figure 3:
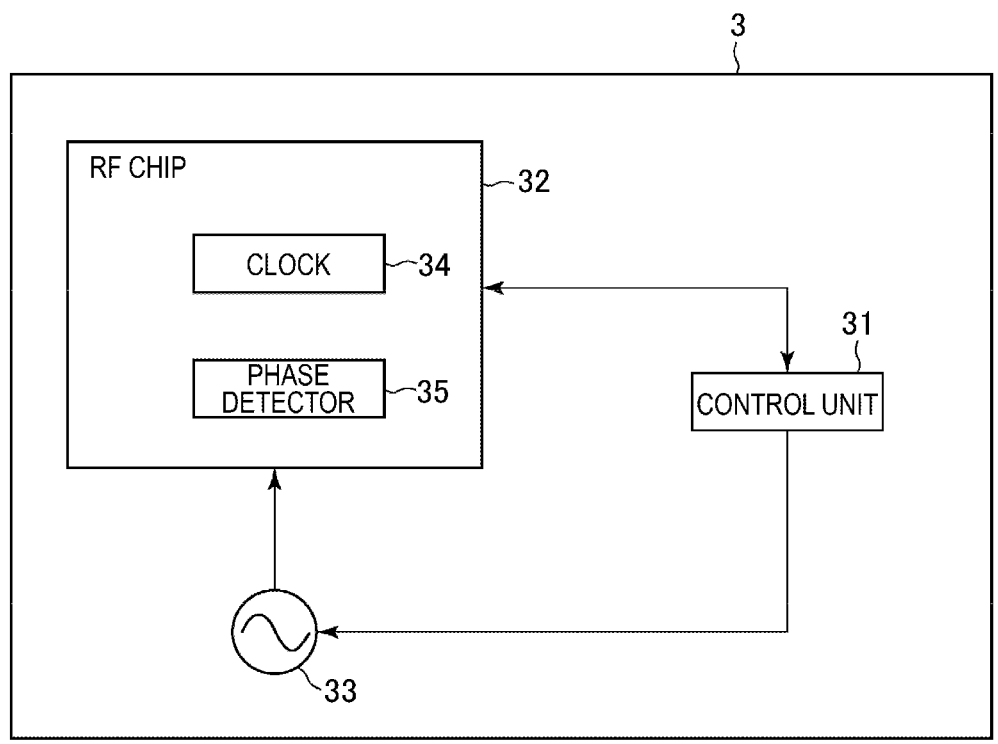
FIG. 3 is a block diagram illustrating a configuration of a follower device corresponding to at least one of the embodiments of the present invention.

The follower device 3 of the present invention will be described. FIG. 3 is a diagram illustrating a configuration of a follower device corresponding to at least one of the embodiments of the present invention. The follower device 3 includes a control unit 31, an RF chip 32, an oscillator 33, a clock 34, and a phase detector 35. The RF chip 32 includes the clock 34 and the phase detector 35. In a case where the follower device 3 functions as, for example, a sensor device, other elements such as a sensor may be provided as necessary in addition to the control unit 31, the RF chip 32, the oscillator 33, the clock 34, and the phase detector 35.

The control unit 31 is not particularly limited, but for example, the microcomputer can be used. The control unit 31 performs a program execution process based on a program and data. The RF chip 32 performs processes of receiving and transmitting the radio signal via the communication network 2. Data received by the RF chip 32 is subjected to the arithmetic process by the control unit 11.

The oscillator 33 oscillates at the predetermined frequency and outputs a signal for giving an operation timing of each unit of the apparatus. As the oscillator 33, for example, the crystal oscillator can be used. The clock 34 clocks the output signal of the oscillator 33 as the source vibration and outputs time. The time clocked by the clock 34 is controlled by the control unit 31 so as to be transmitted to the leader device 1 via the RF chip 32. The phase detector 35 detects the phase of the carrier wave constituting information received from the leader device 1 and detects the phase of the signal oscillated by the oscillator 33 of the follower device 3.

Figure 4:
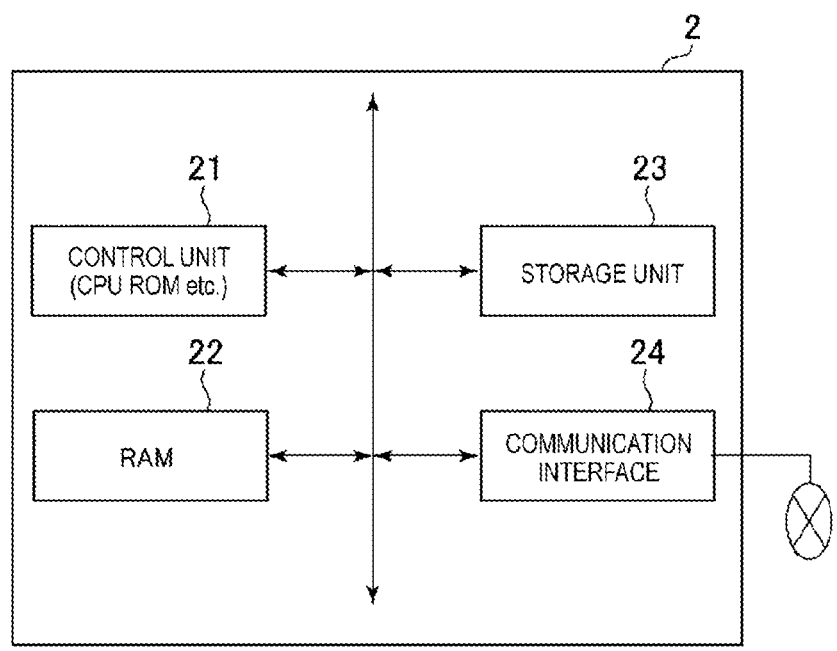
FIG. 4 is a block diagram illustrating a configuration of the server apparatus corresponding to at least one of the embodiments of the present invention.

Next, a server apparatus of the present invention will be described. FIG. 4 is a block diagram illustrating a configuration of the server apparatus corresponding to at least one of the embodiments of the present invention. The server apparatus 2 includes at least a control unit 21, a RAM 22, a storage unit 23, and a communication interface 24, which are connected by an internal bus.

The control unit 21 includes a CPU and a ROM, executes a program stored in the storage unit 23, and controls the server apparatus 2. In addition, the control unit 21 includes an internal timer that clocks time. The RAM 22 is a work area of the control unit 21. The storage unit 23 is a storage area for storing programs and data. The control unit 21 reads the program and the data from the RAM 22, and performs a program execution process based on information or the like received from the leader device 1 or the follower device 3.

Figure 5:
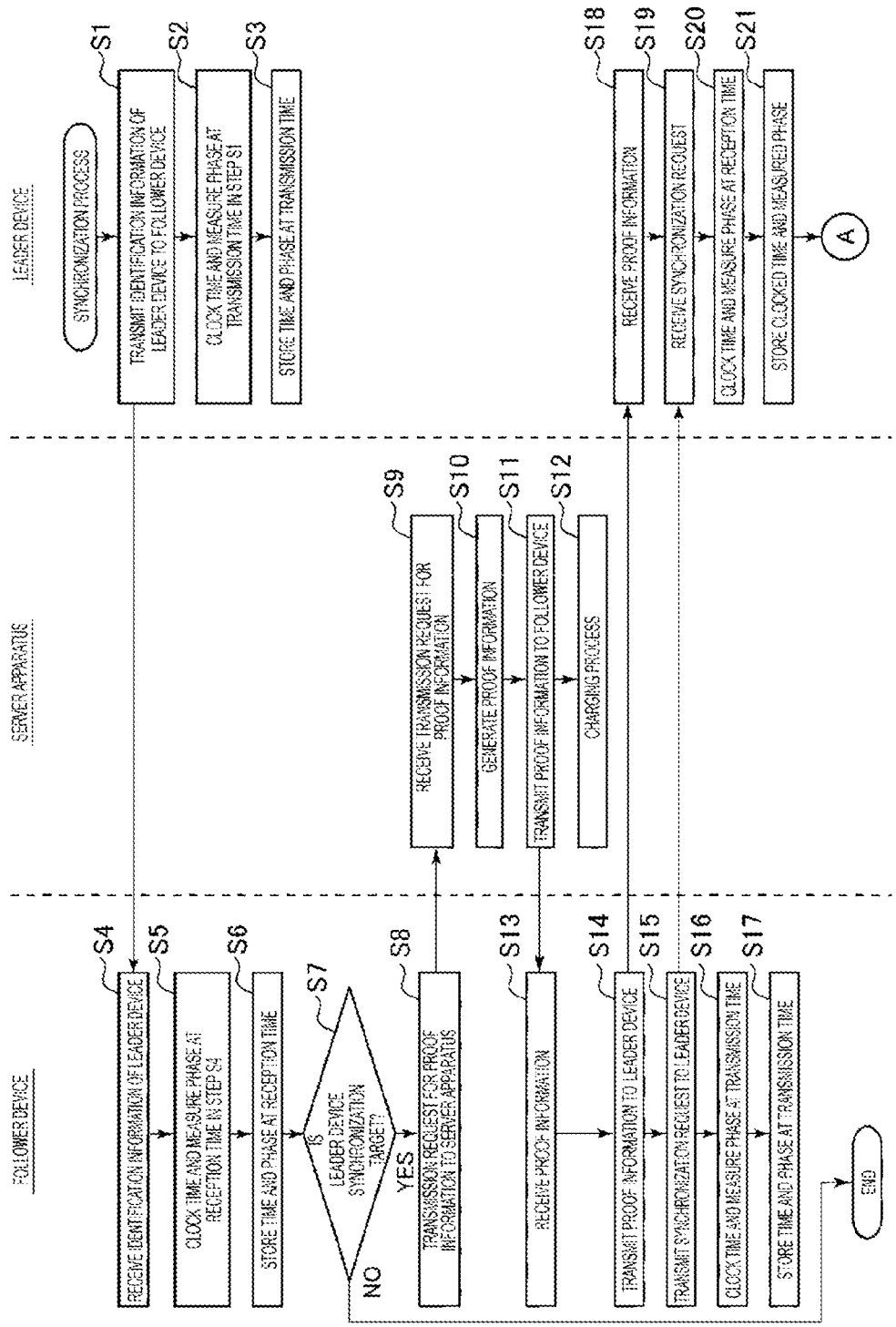
FIG. 5 is a flowchart illustrating the synchronization process corresponding to at least one of the embodiments of the present invention.
Figure 6:
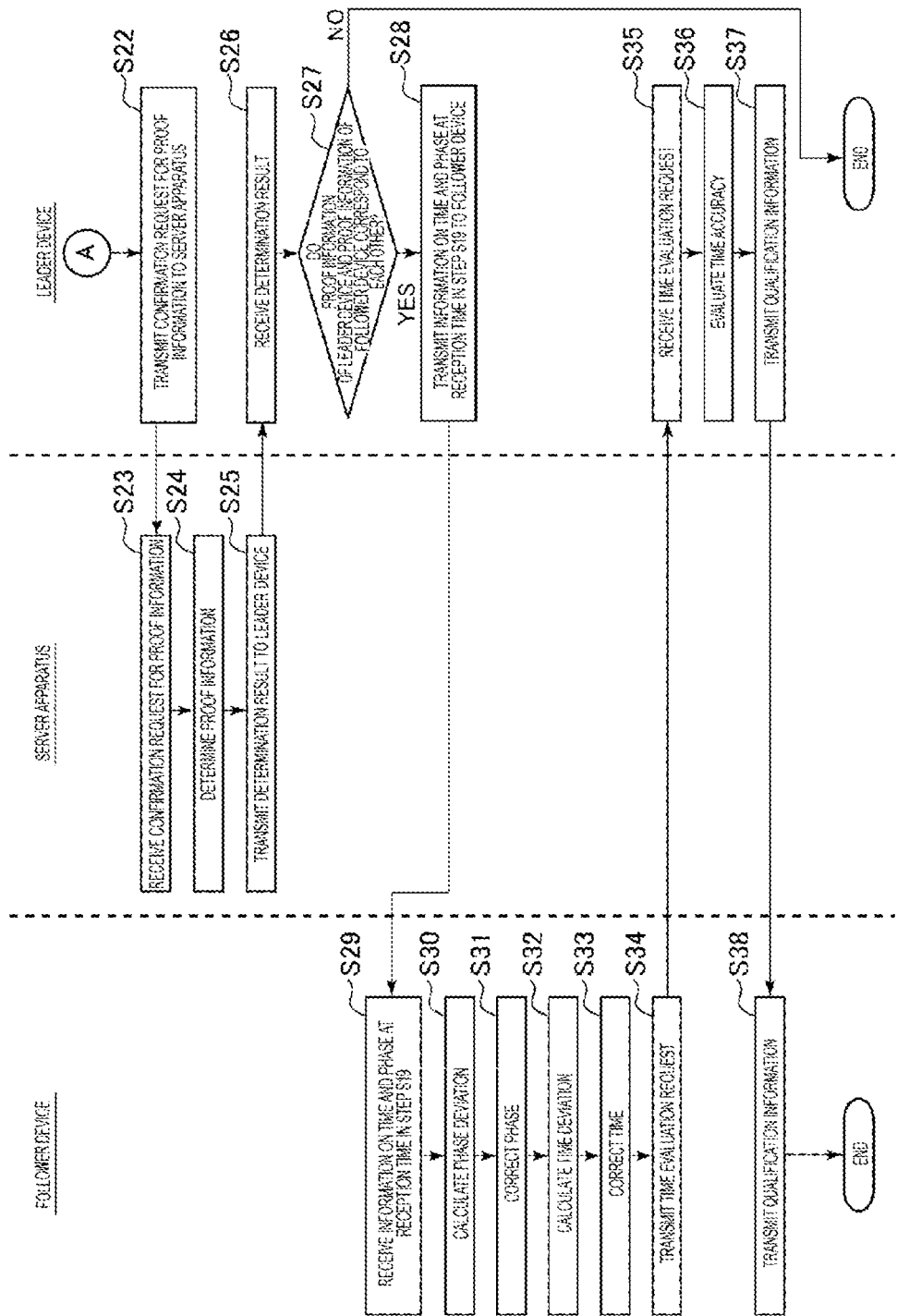
FIG. 6 is a flowchart illustrating the synchronization process corresponding to at least one of the embodiments of the present invention.

Next, a synchronization process of clocks according to one embodiment of the present invention will be described. FIGS. 5 and 6 are flowcharts illustrating the synchronization process of clocks corresponding to at least one of the embodiments of the present invention. A flowchart of one synchronization process is illustrated separately in FIGS. 5 and 6. The order of each process constituting the flowchart may be a random order as long as there is no occurrence of contradiction or inconsistency in the processing content.

The synchronization process of the follower device 3 can be executed periodically. For example, it is possible to set such that the synchronization processes of steps S1 to S38 is started once a day at a predetermined time set in advance.

First, the leader device 1 transmits identification information for identifying the leader device 1 to the follower device 3 (step S1). In each of the leader devices 1, the identification information such as an identification number that enables to uniquely identify the leader device 1 is registered in advance. The leader device 1 clocks the time at which the information was transmitted in step S1, and measures the phase at the time of transmission (step S2). Then, the clocked time and the measured phase are stored in the memory in the control unit 11 (step S3).

Next, the follower device 3 receives the identification information of the leader device 1 (step S4). The leader device 1 clocks the time at which the identification information was received in step S4 and measures the phase at the time of transmission (step S5). Then, the clocked time and the measured phase are stored in the memory in the control unit 31 (step S6).

The follower device 3 determines whether the leader device 1 is a synchronization target of the follower device 3 based on the identification information of the leader device 1 received in step S4 (step S7). When it is determined that the leader device 1 is not the synchronization target of the follower device 3 (No in step S7), the process ends.

When it is determined that the leader device 1 is the synchronization target of the follower device 3 (Yes in step S7), the follower device 3 transmits a transmission request for predetermined information to the server apparatus 2 (step S8). Here, the predetermined information is, for example, information for proving that the clock of the follower device 3 is synchronized using the synchronization system of the present invention. Hereinafter, the predetermined information is referred to as proof information.

Next, when the server apparatus 2 receives the transmission request for the proof information from the follower device 3 (step S9), the control unit 21 of the server apparatus 2 generates the proof information (step S10). The generated proof information may be non-falsifiable.

The generated proof information is transmitted from the server apparatus 2 to the follower device 3 (step S11). As the proof information, for example, a randomly generated character string can be used. In addition to the proof information, the information to be transmitted in step S1*l* can include other information such as identification information that can identify the follower device 3 or identification information that can identify the leader device 1 serving as a synchronization reference of the follower device 3. Furthermore, in step S11, information obtained by encrypting the proof information and other information may be transmitted. The encrypted information including the proof information is decrypted by the leader device 1 or the server apparatus 2 and used.

An operator of the synchronization system of the present invention can charge an owner or a user of the follower device 3 as a reward for executing the synchronization process of the follower device 3. When the proof information is transmitted from the server apparatus 2 to the follower device 3 in step S11, the server apparatus 2 performs a process of executing the charging (step S12). For example, when calculating the charging amount according to the number of times the synchronization process has been executed by the follower device 3, the number of times the proof information has been transmitted from the server apparatus 2 to the follower device 3 is counted in step S12, and the counted number of times is stored in the storage unit 23 to possible to execute the charging. It is also possible to charge the owner or the user of the follower device 3 collectively for each predetermined period such as once a month, or charge the owner or the user for each synchronization.

In the present embodiment, the charging is executed according to the number of times the proof information has been transmitted from the server apparatus 2 to the follower device 3, but the charging may be executed according to generation of the proof information in the server apparatus 2, reception of the proof information by the leader device 1 and/or the follower device 3, calculation of a time deviation or calculation of a phase deviation between the leader device 1 and the follower device 3, or correction of a time or correction of a phase of the follower device 3.

Upon receiving the proof information from the server apparatus 2 (step S13), the follower device 3 transmits the received proof information to the leader device 1 (step S14). The proof information to be transmitted in step S14 may be newly generated by the follower device 3 based on the proof information that has been received in step S11.

Furthermore, the follower device 3 transmits a synchronization request to the leader device 1 (step S15). The follower device 3 clocks the time at which the synchronization request was transmitted and measures the phase at the time of transmission (step S16). Then, the clocked time and the measured phase are stored in the memory in the control unit 31 (step S17).

The leader device 1 receives the proof information transmitted from the follower device 3 in step S14 (step S18), and further receives the synchronization request transmitted in step S15 (step S19). When the pieces of information in steps S14 and S15 are transmitted at the same time, the pieces of information in steps S18 and S19 are received at the same time in the leader device 1.

When the synchronization request is received in the leader device 1 in step S19, the time at which the synchronization request was received in step S19 is clocked, and the phase at the time of reception is measured (step S20). Then, the clocked time and the measured phase are stored in the memory in the control unit 11 (step S21). When step S21 ends, the process proceeds to step S22.

The leader device 1 transmits the proof information and a confirmation request for the proof information to the server apparatus 2 (step S22). As the proof information to be transmitted in step S22, the one newly generated by the leader device 1 based on the proof information that has been received in step S18 may be used.

Similarly to step S11, the information to be transmitted in step S14 or step S22 can include not only the proof information but also other information such as the identification information of the follower device 3 or the leader device 1. Similarly, in step S14 or step S22, information obtained by encrypting the proof information and other information may be transmitted.

When the server apparatus 2 receives the proof information and the confirmation request for the proof information from the leader device 1 (step S23), it is determined whether the proof information received from the leader device 1 corresponds to the proof information transmitted from the server apparatus 2 to the follower device 3 (step S22). Then, the information on the determination result of step S24 is transmitted from the server apparatus 2 to the leader device 1 (step S25).

Next, the leader device 1 receives the information on the determination result of step S24 (step S26). When it is determined that the proof information received from the leader device 1 does not correspond to the proof information transmitted from the server apparatus 2 to the follower device 3 (No in step S27), time synchronization of the follower device 3 is not performed, and the process ends.

On the other hand, when it is determined that the proof information received from the leader device 1 corresponds to the proof information transmitted from the server apparatus 2 to the follower device 3 (Yes in step S27), the leader device 1 transmits, to the follower device 3 by the RF chip 12, the information related to the time and phase when the identification information was transmitted in step S1, which has been stored in step S3, and the information related to the time and phase when the synchronization request was received in step S19, which has been stored in step S21 (step S28).

Then, the follower device 3 receives the information related to the time and phase when the identification information was transmitted in step S1, and the information related to the time and phase when the leader device 1 received the synchronization request in step S19 (step S29).

Next, the control unit 31 of the follower device 3 calculates a phase deviation between the phase of a signal generated by the oscillator of the leader device 1 and the phase of a signal generated by the oscillator of the follower device 3 (step S30). The phase deviation can be calculated based on a phase difference between the phase of the carrier wave constituting information or a signal transmitted from the leader device 1 to the follower device 3 and the phase of a signal oscillated by an oscillator of the follower device 3 when the information or the signal was received by the follower device 3, and a phase difference between the phase of the carrier wave constituting information or a signal transmitted from the follower device 3 to the leader device 1 and the phase of a signal oscillated by an oscillator of a clock of the leader device 1 when the information or the signal was received by the leader device 1.

The phase of the carrier wave constituting the information or the signal transmitted from the leader device 1 to the follower device 3 is the phase of the information transmitted in step S1. The information related to the phase is transmitted from the leader device 1 to the follower device 3 in step S28. The phase of a signal oscillated by the oscillator of the follower device 3 when the information or the signal was received by the follower device 3 is the phase of the information received in step S4. The information related to the phase is measured by the follower device 3 in step S5 and stored in step S6. The phase of the carrier wave constituting information or a signal transmitted from the follower device 3 to the leader device 1 is, for example, the phase of the synchronization request transmitted in step S15. The information related to the phase is stored by the follower device 3 in step S17. The phase of the signal oscillated by the oscillator of the clock of the leader device 1 when the information or the signal was received by the leader device 1 is, for example, the phase of the synchronization request received in step S19. The information related to the phase is measured in step S20 and transmitted from the leader device 1 to the follower device 3 in step S28.

Here, the phase of the carrier wave constituting the information or the signal transmitted from the leader device 1 to the follower device 3 is a concept including not only the phase of the carrier wave constituting the information or the signal transmitted from the leader device 1 to the follower device 3 but also the phase of the carrier wave constituting the signal obtained by mixing down the information or the signal. Similarly, the phase of the carrier wave constituting the information or the signal transmitted from the follower device 3 to the leader device 1 is a concept including not only the phase of the carrier wave constituting the information or the signal transmitted from the follower device 3 to the leader device 1 but also the phase of the carrier wave constituting the signal obtained by mixing down the information or the signal.

A phase difference $\Delta\Phi_P$ generated by the signal propagation between the leader device 1 and the follower device 3 can be calculated from the arithmetic mean of a phase difference $\Delta\Phi_S$ and a phase difference $\Delta\Phi_M$, by defining: as $\Delta\Phi_S$, the phase difference between the phase of the carrier wave constituting information or a signal transmitted from the leader device 1 to the follower device 3 and the phase of the signal oscillated by the oscillator of the follower device 3 when the information or the signal was received by the follower device 3; and as $\Delta\Phi_M$, the phase difference between the phase of the carrier wave constituting information or a signal transmitted from the follower device 3 to the leader device 1 and the phase of the signal oscillated by the oscillator of the leader device 1 when the information or the signal was received by the leader device 1. That is, the phase difference $\Delta\Phi_P$ can be calculated by Equation (1): $\Delta\Phi_P = \frac{1}{2} \times (\Delta\Phi_S + \Delta\Phi_M)$.

When the phase deviation between the leader device 1 and the follower device 3 is defined as $\Delta\Phi_C$, the relationship expressed by Equation (2): $\Delta\Phi_M = \Delta\Phi_P + (-\Delta\Phi_C)$ is established, so that the phase deviation $\Delta\Phi_C$ can be calculated by subtracting the phase difference $\Delta\Phi_M$ from the phase difference $\Delta\Phi_P$. That is, the phase difference $\Delta\Phi_C$ can be calculated by Equation (2): $\Delta\Phi_C = \frac{1}{2} \times (\Delta\Phi_S - \Delta\Phi_M)$. In step S30, the phase deviation between the leader device 1 and the follower device 3 is calculated using Equation (2).

Here, the phase deviation $\Delta\Phi_C$ is calculated by Equation (2), but in some cases, the phase deviation $\Delta\Phi_C$ to be calculated may be obtained by further subtracting $2\Pi$ or $4\Pi$, that is, $2n\Pi$. n may take zero or a positive integer. Therefore, it is also possible to specify whether n is zero, or an integer such as 1 or 2 (that is, whether the value obtained by further subtracting $2n\Pi$ from the phase difference $\Delta\Phi_C$ obtained by Equation (2) is the original phase deviation or whether the value not subtracted is the original phase deviation) based on a propagation time $T_P$ to be described later or a time deviation between the leader device 1 and the follower device 3.

There may be a case such that the signal transmitted from the leader device 1 to the follower device 3 and the signal transmitted from the follower device 3 to the leader device 1 start with an output that is not zero but is an arbitrary value at the start of transmission. In such a case, it is necessary to correct the phase deviation $\Delta\Phi_C$ by measuring the phase at the start of transmission and the transmission time. Meanwhile, by configuring such that the phase at the start of transmission is always constant and transmission is performed at a predetermined time, it is possible to omit such a process of correcting $\Delta\Phi_C$ after measuring the phase at the start of transmission and the transmission time.

The follower device 3 corrects the phase of the signal generated by the oscillator of the follower device 3 so as to be synchronized with the signal generated by the oscillator of the leader device 1 based on the calculated phase deviation $\Delta\Phi_C$ (step S31). The correction of the phase in step S31 is controlled and executed by the control unit 11. The phase deviation of the oscillator of the follower device 3 occurs due to the surrounding environment of the follower device 3. By periodically performing the synchronization process in this manner, the clock 34 of the follower device 3 can be continuously clocked with high accuracy.

Next, the leader device 1 calculates a time deviation between the leader device 1 and the follower device 3 based on the time at which information or a signal was transmitted from the leader device 1 to the follower device 3, the time at which information or a signal was transmitted from the follower device 3 to the leader device 1, the time clocked by the follower device 3 at which the follower device 3 received information or a signal transmitted from the leader device 1, the time clocked by the leader device 1 at which the leader device 1 received information or a signal transmitted from the follower device 3 (step S32).

The time at which information or a signal was transmitted from the leader device 1 to the follower device 3 is the time at which the information was transmitted in step S1. The information related to the time is transmitted from the leader device 1 to the follower device 3 in step S28. The time at which information or a signal was transmitted from the follower device 3 to the leader device 1 is the time at which the synchronization request was transmitted in step S15. The information related to the time is stored by the follower device 3 in step S17. Next, the time clocked by the follower device 3 at which the follower device 3 received information or a signal transmitted from the leader device 1 is the time at which the information was received in step S4. The information related to the time is clocked by the follower device 3 in step S5 and stored in step S6. The time clocked by the leader device 1 at which the leader device 1 received information or a signal transmitted from the follower device 3 is the time at which the synchronization request was received in step S19. The information related to the time is clocked in step S20 and transmitted from the leader device 1 to the follower device 3 in step S28.

The time deviation between the leader device 1 and the follower device 3 can be calculated by Equation (3): $T_L = \frac{1}{2} \times ((T_{SM} - T_S) - (T_{MS} - T_M))$ by defining: as $T_M$, a time at which information or a signal was transmitted from the leader device 1 to the follower device 3; as $T_S$, a time at which information or a signal was transmitted from the follower device 3 to the leader device 1; as $T_{MS}$, a time clocked by the follower device 3 at which the follower device 3 received information or a signal transmitted from the leader device 1; and further as $T_{SM}$, a time clocked by the leader device 1 at which the leader device 1 received information or a signal transmitted from the follower device 3. In step S32, the time deviation between the leader device 1 and the follower device 3 is calculated by Equation (3).

The follower device 3 corrects the time in the follower device 3 so as to be synchronized with the time in the leader device 1 based on the calculated time deviation (step S33).

Next, the follower device 3 transmits, to the leader device 1 together with a time evaluation request, information related to the time at which the identification information was received in step 4 and the phase of the received identification information, and, the time at which the synchronization request was transmitted in step S15 and the phase of the transmitted synchronization request (step S34). The time at which the identification information was received and the phase of the identification information are the ones that have been measured in step S5 and stored in the follower device 3 in step S6. The time at which the synchronization request was transmitted and the phase of the synchronization request are the ones that have been measured in step S16 and stored in the follower device 3 in step S17. The leader device 1 receives the time at which the identification information was received in step 4 and the phase of the received identification information together with the time evaluation request (step S35).

The leader device 1 evaluates a time accuracy of the follower device 3 based on the information received in step S35 (step S36). In step S36, the time accuracy of the follower device 3 is evaluated by calculating the phase deviation in the follower device 3 by the method similar to step S30 and calculating the time deviation in the follower device 3 by the method similar to step S32. It is possible to assign a time accuracy grade to the calculated time deviation and phase deviation based on a predetermined reference. The time accuracy grade assigned to the follower device 3 is transmitted as qualification information from the leader device 1 to the follower device 3 (step S37). When the follower device 3 receives the qualification information (step S38), a series of processes ends.

In the above embodiment, the description has been made on the assumption that the leader device 1 and the server apparatus 2 are separate devices, but the leader device 1 and the server apparatus 2 may be configured as an integrated device. In this case, the processes executed by the server apparatus 2 in the above embodiment are executed by the leader device 1. For example, the processes of steps S9 to S12 and S23 to S25 are executed by the leader device 1.

In the above embodiment, the server apparatus 2 generates the proof information every time the synchronization process is executed. It also can be configured such that when executing the synchronization of the follower device 3, the time deviation and the phase deviation of the follower device 3 are corrected without: generating the proof information in the server apparatus 2; transmitting the proof information from the server apparatus 2 to the follower device 3; and transmitting the proof information from the follower device 3 to the leader device. For example, the proof information may include information related to a period or a condition in which the synchronization process of the follower device 3 can be executed. Once the follower device 3 receives the proof information from the server apparatus 2, the follower device 3 can execute the synchronization process a plurality of times without receiving the proof information from the server apparatus 2 as long as the period and the condition are satisfied.

Furthermore, in a case where the plurality of follower devices 3 exist, one of the follower devices 3 receives the proof information from the server apparatus 2, so that not only the follower device 3 that has received the proof information but also the other follower devices 3 can be configured to execute the synchronization process. In this case, the proof information includes information that can identify the follower device 3 that can be a target of the synchronization process, and the synchronization process can be executed on the identified follower device 3 without receiving the proof information from the server apparatus 2.

In the above embodiment, the matter of executing the process of charging has been described. It can be configured in such a way that the frequency of executing the time correction or the phase correction, the accuracy of the clock of the leader device 1 to be a basis for the calculation of time deviation or phase deviation, a distance between the leader device 1 and the follower device 3, or response speed of the leader device 1, the follower device 3, and/or the server apparatus 2, are controlled to be different according to the charging amount. For example, as the charging amount per predetermined number of times or the charging amount per predetermined period becomes higher, the frequency of the time correction or the phase correction can be increased, or the time deviation or the phase deviation can be calculated based on a clock with higher accuracy. In addition, as the charging amount per predetermined number of times or the charging amount per predetermined period becomes higher, it is possible to perform control such that after information has been transmitted from any one of the leader device 1, the follower device 3, and the server apparatus 2, the response speed (for example, the speed until the next process is executed in the device that has received the information, or the speed until the information is transmitted from the device that has received the information to the next device) in the device that has received the information becomes faster.

REFERENCE SIGNS LIST 1 leader device
2 server apparatus
3 follower device
11 control unit
12 RF chip
13 oscillator
14 clock
15 phase detector
21 control unit
22 RAM
23 storage unit
24 communication interface
31 control unit
32 RF chip
33 oscillator
34 clock
35 phase detector

The invention claimed is:

1. A synchronization system of clocks comprising: a leader device;
a follower device capable of establishing communication connection with the leader device; and
a server apparatus capable of establishing communication connection with the leader device and/or the follower device, the system further comprising:
a time deviation calculator configured to calculate a time deviation between the leader device and the follower device; and
a time corrector configured to correct a time in the follower device based on the calculated time deviation, wherein
the synchronization system executes the time deviation calculator and/or the time corrector when the server apparatus generates, transmits, and/or receives predetermined information,
the follower device includes
a first information transmitter configured to transmit information or a signal to the leader device,
the leader device includes
a second information transmitter configured to transmit information or a signal to the follower device, and
the time deviation calculator calculates the time deviation between the leader device and the follower device by calculating $\frac{1}{2} \times ((T_{SM} - T_S) - (T_{MS} - T_M))$, by defining: as $T_M$, a time at which the information or the signal is transmitted from the leader device to the follower device; as $T_S$, a time at which the information or the signal is transmitted from the follower device to the leader device; as $T_{MS}$, a time clocked by the follower device at which the follower device received the information or the signal transmitted from the leader device; and further as $T_{SM}$, a time clocked by the leader device at which the leader device received the information or the signal transmitted from the follower device.

2. The synchronization system according to claim 1, wherein the follower device includes:
a transmission requestor configured to transmit a transmission request of predetermined information to the server apparatus; and
a second predetermined information transmitter configured to transmit, upon receiving predetermined information from the server apparatus, the received predetermined information to the leader device,
the server apparatus includes:
a first predetermined information transmitter configured to transmit, upon receiving a transmission request for predetermined information from the follower device, the predetermined information to the follower device; and
a predetermined information determinator configured to determine, upon receiving predetermined information from the leader device, whether the predetermined information received from the leader device corresponds to the predetermined information transmitted to the follower device,
the leader device includes
a third predetermined information transmitter configured to transmit, upon receiving predetermined information from the follower device, the predetermined information to the server apparatus, and
the synchronization system executes the time deviation calculator and/or the time corrector when it is determined that the predetermined information received from the leader device corresponds to the predetermined information transmitted to the follower device.

3. The synchronization system according to claim 1, the system further comprising:
a phase deviation calculator configured to calculate clocks phase deviation between the leader device and the follower device; and
a phase corrector configured to correct a phase in the follower device based on the calculated phase deviation, wherein
the synchronization system executes the phase deviation calculator and/or the phase corrector when the server apparatus generates, transmits, and/or receives predetermined information.

4. The synchronization system according to claim 3, wherein
the follower device includes:
a transmission requestor configured to transmit a transmission request of predetermined information to the server apparatus; and
a second predetermined information transmitter configured to transmit, upon receiving predetermined information from the server apparatus, the received predetermined information to the leader device,
the server apparatus includes:
a first predetermined information transmitter configured to transmit, upon receiving a transmission request for predetermined information from the follower device, the predetermined information to the follower device; and
a predetermined information determinator configured to determine, upon receiving predetermined information from the leader device, whether the predetermined information received from the leader device corresponds to the predetermined information transmitted to the follower device,
the leader device includes
a third predetermined information transmitter configured to transmit, upon receiving predetermined information from the follower device, the predetermined information to the server apparatus, and
the synchronization system executes the phase deviation calculator and/or the phase corrector when it is determined that the predetermined information received from the leader device corresponds to the predetermined information transmitted to the follower device.

5. The synchronization system according to claim 3, wherein
the phase deviation calculator calculates
the phase deviation based on a phase difference between a phase of a carrier wave constituting information or a signal transmitted from the leader device to the follower device and a phase of a signal oscillated by an oscillator of a clock of the follower device when the information or the signal is received by the follower device, and a phase difference between a phase of a carrier wave constituting information or a signal transmitted from the follower device to the leader device and a phase of a signal oscillated by an oscillator of a clock of the leader device when the information or the signal is received by the leader device.

6. The synchronization system according to claim 5, wherein
the phase deviation calculator calculates
the phase deviation between the leader device and the follower device by calculating $\Delta\Phi_P = \frac{1}{2} \times (\Delta\Phi_S - \Delta\Phi_M)$, by defining: as $\Delta\Phi_S$, a phase difference between a phase of a carrier wave constituting information or a signal transmitted from the leader device to the follower device and a phase of a signal oscillated by an oscillator of a clock when the information or the signal is received by the follower device; and as $\Delta\Phi_M$, a phase difference between a phase of a carrier wave constituting information or a signal transmitted from the follower device to the leader device and a phase of a signal oscillated by an oscillator of a clock when the information or the signal is received by the leader device.

7. The synchronization system according to claim 1, comprising
a charger configured to charge an owner or a user of the follower device in accordance with generation, transmission, and/or reception of the predetermined information, calculation of a time deviation, correction of a time, calculation of a phase deviation, or correction of a phase.

8. The synchronization system according to claim 7, comprising
a controller configured to control according to a charging amount by the charger: a frequency of executing the time corrector or the phase corrector; accuracy of a clock of the leader device that serves as a basis of calculation of the time deviation calculator or the phase deviation calculator; a distance between the leader device and the follower device; or a response speed of the leader device, the follower device, and/or the server apparatus.

9. A synchronization method of clocks to be executed in a synchronization system of clocks, the system including a leader device, a follower device capable of establishing communication connection with the leader device, and a server apparatus capable of establishing communication connection with the leader device and/or the follower device, the method comprising:
calculating a time deviation between the leader device and the follower device; and correcting the time in the follower device based on the calculated time deviation, wherein the synchronization method executes the time deviation calculating and/or the time correcting when the server apparatus generates, transmits, and/or receives predetermined information, the follower device includes a first information transmitter configured to transmit information or a signal to the leader device, the leader device includes a second information transmitter configured to transmit information or a signal to the follower device, and wherein the calculating of the time deviation between the leader device and the follower device is performed by calculating $\frac{1}{2}\times((T_{SM}-T_S)-(T_{MS}-T_M))$, by defining: as $T_M$, a time at which the information or the signal is transmitted from the leader device to the follower device; as $T_S$, a time at which the information or the signal is transmitted from the follower device to the leader device; as $T_{MS}$, a time clocked by the follower device at which the follower device received the information or the signal transmitted from the leader device; and further as $T_{SM}$, a time clocked by the leader device at which the leader device received the information or the signal transmitted from the follower device.

10. The synchronization method according to claim 9, the method comprising:

calculating a phase deviation of clocks between the leader device and the follower device; and correcting a phase in the follower device based on the calculated phase deviation, wherein the synchronization method executes the phase deviation calculating and/or the phase correcting when the server apparatus generates, transmits, and/or receives predetermined information.

11. A synchronization system of clocks comprising a leader device and a follower device capable of communicating with the leader device, the system further comprising:

a time deviation calculator configured to calculate a time deviation between the leader device and the follower device; and a time corrector configured to correct a time in the follower device based on the calculated time deviation, wherein the synchronization system executes a time deviation calculator and/or a time corrector when the leader device generates, transmits, and/or receives predetermined information, the follower device includes a first information transmitter configured to transmit information or a signal to the leader device, the leader device includes a second information transmitter configured to transmit information or a signal to the follower device, and the time deviation calculator calculates the time deviation between the leader device and the follower device by calculating $\frac{1}{2}\times((T_{SM}-T_S)-(T_{MS}-T_M))$, by defining: as $T_M$, a time at which the information or the signal is transmitted from the leader device to the follower device; as $T_S$, a time at which the information or the signal is transmitted from the follower device to the leader device; as $T_{MS}$, a time clocked by the follower device at which the follower device received the information or the signal transmitted from the leader device; and further as $T_{SM}$, a time clocked by the leader device at which the leader device received the information or the signal transmitted from the follower device.

12. The synchronization system according to claim 11, the system further comprising:

a phase deviation calculator configured to calculate a phase deviation of clocks between the leader device and the follower device; and a phase corrector configured to correct a phase in the follower device based on the calculated phase deviation, wherein the synchronization system executes the phase deviation calculator and/or the phase corrector when the leader device generates, transmits, and/or receives predetermined information.

13. A synchronization method of clocks to be executed in a synchronization system of clocks, the system including a leader device and a follower device capable of communicating with the leader device, the method comprising:

calculating a time deviation between the leader device and the follower device; and correcting the time in the follower device based on the calculated time deviation, wherein the synchronization method executes the time deviation calculating and/or a time correcting when the leader device generates, transmits, and/or receives predetermined information, the follower device includes a first information transmitter configured to transmit information or a signal to the leader device, the leader device includes a second information transmitter configured to transmit information or a signal to the follower device, and wherein the calculating of the time deviation between the leader device and the follower device is performed by calculating $\frac{1}{2}\times((T_{SM}-T_S)-(T_{MS}-T_M))$, by defining: as $T_M$, a time at which the information or the signal is transmitted from the leader device to the follower device; as $T_S$, a time at which the information or the signal is transmitted from the follower device to the leader device; as $T_{MS}$, a time clocked by the follower device at which the follower device received the information or the signal transmitted from the leader device; and further as $T_{SM}$, a time clocked by the leader device at which the leader device received the information or the signal transmitted from the follower device.

14. The synchronization method according to claim 13, the method comprising:

calculating a phase deviation of clocks between the leader device and the follower device; and correcting a phase in the follower device based on the calculated phase deviation, wherein the synchronization method executes the phase deviation calculating and/or the phase correcting when the leader device generates, transmits, and/or receives predetermined information.

15. The synchronization system according to claim 3, comprising a charger configured to charge an owner or a user of the follower device in accordance with generation, transmission, and/or reception of the predetermined information, calculation of a time deviation, correction of a time, calculation of a phase deviation, or correction of a phase.

16. The synchronization system according to claim 15, comprising a controller configured to control according to a charging amount by the charger: a frequency of executing the time corrector or the phase corrector; accuracy of a clock of the leader device that serves as a basis of calculation of the time deviation calculator or the phase deviation calculator; a distance between the leader device and the follower device; or a response speed of the leader device, the follower device, and/or the server apparatus.

* * * * *